United States Patent
Wang et al.

(10) Patent No.: US 12,141,681 B2
(45) Date of Patent: Nov. 12, 2024

(54) MERGE OPERATIONS FOR DARTS

(71) Applicant: International Business Machines Corporation, Armonk, NY (US)

(72) Inventors: Xiaoxing Wang, Beijing (CN); Chao Xue, Beijing (CN); Yonggang Hu, Richmond Hill (CA); Ke Wei Sun, Beijing (CN)

(73) Assignee: International Business Machines Corporation, Armonk, NY (US)

(*) Notice: Subject to any disclaimer, the term of this patent is extended or adjusted under 35 U.S.C. 154(b) by 936 days.

(21) Appl. No.: 17/128,290

(22) Filed: Dec. 21, 2020

(65) Prior Publication Data

US 2022/0198248 A1    Jun. 23, 2022

(51) Int. Cl.
*G06N 3/063* (2023.01)
*G06F 16/2455* (2019.01)
*G06N 3/04* (2023.01)

(52) U.S. Cl.
CPC ......... *G06N 3/063* (2013.01); *G06F 16/2455* (2019.01); *G06N 3/04* (2013.01)

(58) Field of Classification Search
CPC .......... G06N 3/063; G06N 3/04; G06N 3/045; G06N 3/08; G06F 16/2455
See application file for complete search history.

(56) References Cited

U.S. PATENT DOCUMENTS

2020/0082275 A1  3/2020  Sun
2020/0143227 A1  5/2020  Tan
2021/0312278 A1* 10/2021 Kwon .................... G06N 3/082
2022/0129740 A1* 4/2022 Yang ..................... G06N 3/063
2022/0382038 A1* 12/2022 Amthor .................. G06N 3/08

OTHER PUBLICATIONS

Chou et al. ("Merging Deep Neural Networks for Mobile Devices", 2018 IEEE/CVF, pp. 1767-1775) (Year: 2018).*
Qin et al. ("Merging and Evolution: Improving Convolutional Neural Networks for Mobile Applications", 2018 International Joint Conference on Neural Networks (IJCNN), Rio de Janeiro, Brazil, 2018, pp. 1-8) (Year: 2018).*
Zhou et al. ("OpenCL-code Generation Framework for MobileNets with Depthwise Separable Convolution and Merged Layers", Proc. SPIE 11431, MIPPR 2019: Parallel Processing of Images and Optimization Techniques; and Medical Imaging, 1143108 (Feb. 14, 2020) (Year: 2020).*
Bender et al. (NPL, "Understanding and Simplifying One-Shot Architecture Search", PMLR 80, 2018) (Year: 2018).*
Chollet et al. (NPL. "Xception: Deep Learning with Depthwise Separable Convolutions", google 2017) (Year: 2017).*

(Continued)

*Primary Examiner* — Michael J Huntley
*Assistant Examiner* — Imad Kassim
(74) *Attorney, Agent, or Firm* — Yee & Associates, P.C.

(57) ABSTRACT

A one-shot neural architecture search method referred to as MergeNAS by merging different types of convolutions into a single operation. This mergence approach reduces the search cost to roughly half a GPU-day as well as alleviates the over-fitting problem caused by a traditional differentiable architecture search (DARTS) approach by reducing the number of redundant parameters.

3 Claims, 6 Drawing Sheets

(56) References Cited

OTHER PUBLICATIONS

Nakai et al. (NPL, "Att-Darts: Differentiable Neural Architecture Search for Attention", 2020, pp. 1-8) (Year: 2020).*
"Single Path One-Shot Neural Architecture Search With Uniform Sampling", Under review as a conference paper at CLR 2020, 15 pages.
Grace Period Disclosure, "MergeNAS: Merge Operations into One for Differentiable Architecture Search", Jul. 15, 2020, 7 pages.
Ren et al., "A Comprehensive Survey of Neural Architecture Search: Challenges and Solutions", arXiv:2006.02903v1 [cs.LG] Jun. 1, 2020, 30 pages.

* cited by examiner

| Architecture | Test Error (%) | Params (M) | #ops | Search Cost (GPU-days) | Search Method |
|---|---|---|---|---|---|
| DenseNet-BC [Huang et al., 2017] | 3.46 | 25.6 | - | - | manual |
| NASNet-A + cutout [Zoph et al., 2018] | 2.65 | 3.3 | 13 | 1800 | RL |
| AmoebaNet-B + cutout [Real et al., 2019] | 2.55±0.05 | 2.8 | 19 | 3150 | evolution |
| Hierarchical Evo [Liu et al., 2018b] | 3.75±0.12 | 15.7 | 6 | 300 | evolution |
| PNAS [Liu et al., 2018a] | 3.41±0.09 | 3.2 | 8 | 225 | SMBO |
| ENAS + cutout [Pham et al., 2018] | 2.89 | 4.6 | 6 | 0.5 | RL |
| DARTS (1st order) + cutout [Liu et al., 2019] | 3.00±0.14 | 3.3 | 7 | 0.4 | gradient-based |
| DARTS (2nd order) + cutout [Liu et al., 2019] | 2.76±0.09 | 3.4 | 7 | 1.0 | gradient-based |
| SNAS (moderate) + cutout [Xie et al., 2019] | 2.85±0.02 | 2.8 | 7 | 1.5 | gradient-based |
| ProxylessNAS + cutout [Cai et al., 2019] | 2.08 | 5.7 | 7 | 4.0 | gradient-based |
| P-DARTS + cutout [Chen et al., 2019] | 2.50 | 3.4 | 7 | 0.3 | gradient-based |
| PC-DARTS (1st order) + cutout [Xu et al., 2020] | 2.57±0.07 | 3.6 | 7 | 0.1 | gradient-based |
| BayesNAS + cutout [Zhou et al., 2019] | 2.81±0.04 | 3.4 | 7 | 0.2 | gradient-based |
| MergeNAS (1st order) + cutout | 2.73±0.02 | 2.9 | 7 | 0.2 | gradient-based |
| MergeNAS (2nd order) + cutout | 2.68±0.01 | 2.9 | 7 | 0.6 | gradient-based |

FIG. 4

| Architecture | test accuracy (%) on CIFAR10 | | | | CIFAR100 | | ImageNet-16-120 | |
|---|---|---|---|---|---|---|---|---|
| | trial₁ | trial₂ | trial₃ | average | valid | test | valid | test |
| RSPS | 90.77 | 91.91 | 93.11 | 91.93 | 67.45 | 67.63 | 39.58 | 39.80 |
| GDAS | 92.28 | 91.93 | 91.93 | 92.05 | 66.81 | 67.25 | 39.42 | 38.92 |
| SETN | 92.48 | 91.58 | 93.30 | 92.45 | 69.02 | 69.03 | 42.19 | 42.29 |
| ENAS | 39.13 | 39.13 | 39.13 | 39.13 | 15.62 | 15.62 | 15.87 | 15.87 |
| DARTS-V2 (wd=1e−2) | 80.57 | 93.31 | 88.21 | 87.36 | 59.90 | 59.80 | 36.06 | 35.58 |
| DARTS-V2 (wd=2e−2) | 87.50 | 87.50 | 85.21 | 86.74 | 57.67 | 57.38 | 31.09 | 30.78 |
| MergeNAS-V2 (wd=1e−2) | 90.65 | 90.65 | 94.36 | 91.89 | 69.28 | 69.44 | 42.38 | 41.87 |
| MergeNAS-V2 (wd=2e−2) | 94.36 | 94.36 | 94.36 | 94.36 | 73.49 | 73.51 | 46.37 | 46.34 |
| RS | | 93.19±0.72 | | | 69.73 | 69.89 | 43.15 | 43.09 |
| REA | | 92.86±0.86 | | | 69.07 | 69.25 | 42.32 | 42.34 |
| REINFORCE | | 93.31±0.58 | | | 70.14 | 70.26 | 42.62 | 43.03 |
| BOHB | | 93.14±0.74 | | | 69.58 | 69.79 | 43.04 | 42.96 |
| ResNet | | 93.97 | | | 70.42 | 70.86 | 44.53 | 43.63 |
| Optimal | | 94.37 | | | 73.49 | 73.51 | 46.77 | 47.31 |

FIG. 5

MERGE OPERATIONS FOR DARTS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

MergeNAS: Merge Operations into One for Differentiable Architecture Search, Anonymous Authors, made publicly available on at least Jul. 1, 2020.

BACKGROUND

The present invention relates generally to the field of neural architecture search, and more particularly to making and using a more efficient version of a differentiable architecture search.

The Wikipedia entry for "Neural architecture search" (as of Nov. 30, 2020) states as follows: "Neural architecture search (NAS) is a technique for automating the design of artificial neural networks (ANN), a widely used model in the field of machine learning. NAS has been used to design networks that are on par or outperform hand-designed architectures. Methods for NAS can be categorized according to the search space, search strategy and performance estimation strategy used . . . . The search space defines the type(s) of ANN that can be designed and optimized . . . . The search strategy defines the approach used to explore the search space . . . [and] The performance estimation strategy evaluates the performance of a possible ANN from its design (without constructing and training it)."

SUMMARY

According to an aspect of the present invention, there is a method, computer program product and/or system that performs the following operations (not necessarily in the following order): (i) receiving a plurality of convolutions, with each given convolution of the plurality of convolutions being a linear operation, and with each given convolution of the plurality of convolutions having a respectively corresponding weight tensor; (ii) for each given convolution of the plurality of convolutions, assigning a uniform weight tensor, with the uniform weight tensor being a weight tensor that has a single tensor value; (iii) responsive to the determination that each given convolution can be assigned the uniform weight tensor, for each given convolution: activating, through the use of binary matrix mask, items from the uniform weight tensor; and (iv) responsive to the activation, merging the plurality of convolutions into one convolution to obtain a first merged convolution.

BRIEF DESCRIPTION OF THE DRAWINGS

FIG. 4 is a screenshot of a first table showing information that is helpful in understanding embodiments of the present invention;

FIG. 5 is a screenshot of a second table showing information that is helpful in understanding embodiments of the present invention.

DETAILED DESCRIPTION

Figure 1:
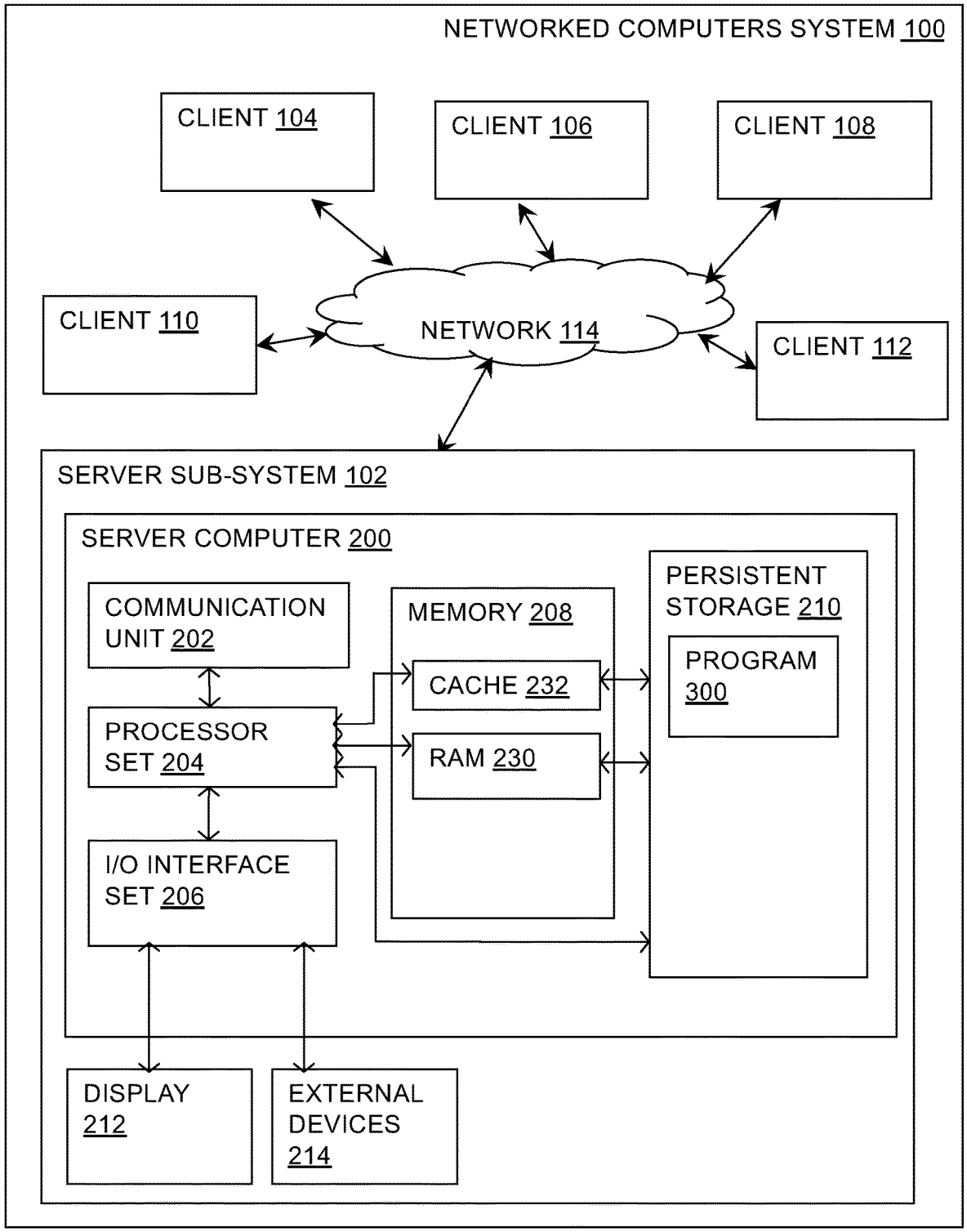
FIG. 1 is a block diagram view of a first embodiment of a system according to the present invention.

Some embodiments of the present invention are directed to a one-shot neural architecture search method referred to as MergeNAS by merging different types of convolutions into a single operation. This mergence approach reduces the search cost to roughly half a GPU-day as well as alleviates the over-fitting problem caused by a traditional DARTS approach by reducing the number of redundant parameters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
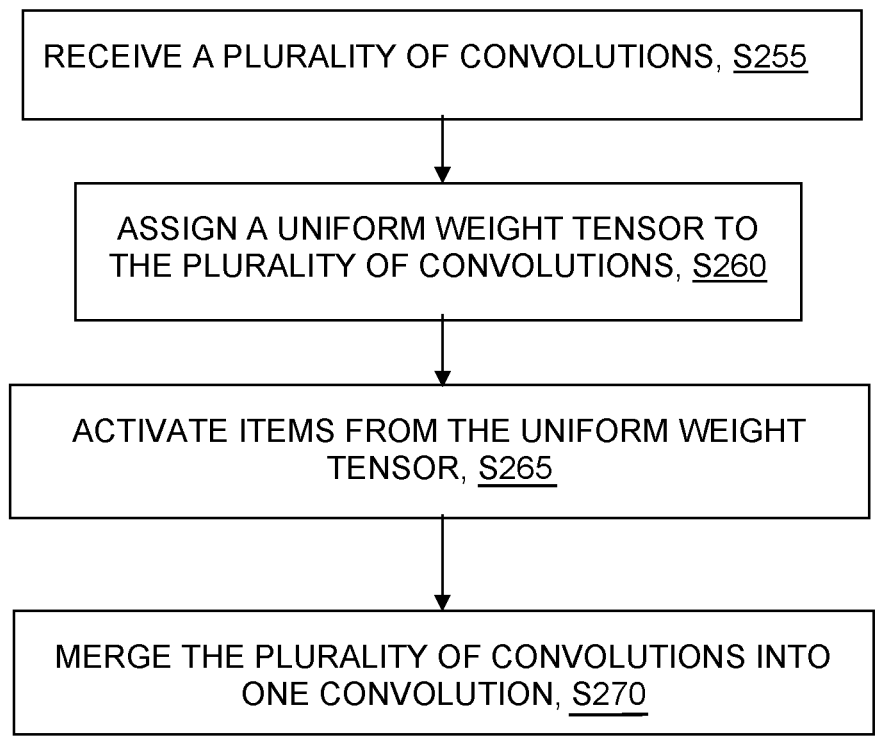
FIG. 2 is a flowchart showing a first embodiment method performed, at least in part, by the first embodiment system.
Figure 3:
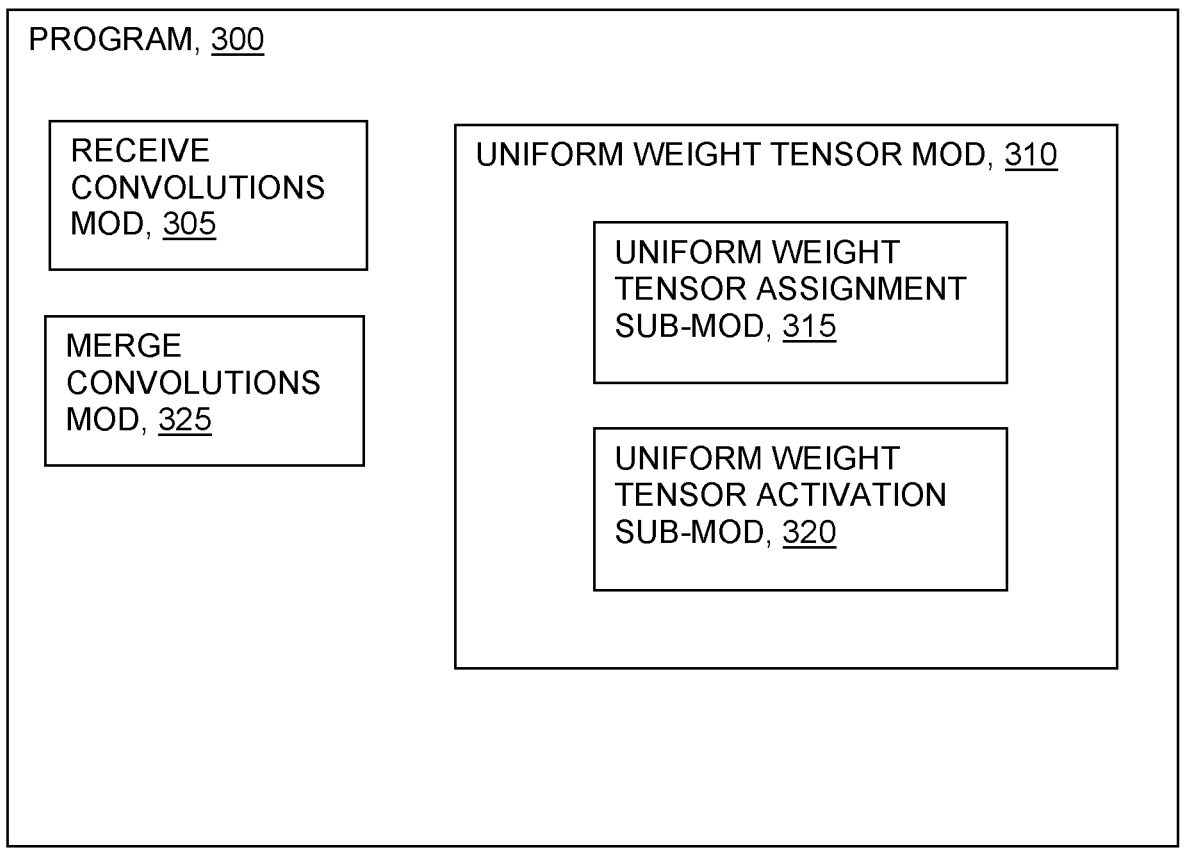
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive convolutions module ("mod") 305 receives a first plurality of convolutions. In some embodiments of the present invention, each convolution is a linear operation. Additionally, each convolution that is received by receive convolutions mod 305 has its own respectively corresponding weight tensor.

Processing proceeds to operation S260, where uniform weight tensor assignment sub-module ("sub-mod") 315 of uniform weight tensor mod 310 assigns a uniform weight tensor to each and every convolution that is received by receive convolutions mod 305 (discussed above in connection with operation S255). In essence, uniform weight tensor assignment sub-mod 315 re-assigns a weight tensor to the received convolutions because at the point in time the first plurality of convolutions is received, each convolution of the plurality of convolutions has its own weight tensor.

Processing proceeds to operation S265, where uniform weight tensor activation sub-mod 320 of uniform weight tensor mod 310 activates items from the uniform weight tensor. In some embodiments of the present invention, uniform weight tensor activation sub-mod activates these items through the use of a binary matrix mask. Finally, processing proceeds to operation S270, where merge convolutions mod 325 merges the plurality of convolutions into one convolution. Merging the plurality of convolutions into one convolution is shown through the use of the following algorithm, referred to in this document as the MergeNAS algorithm:

Inputs for the MergeNAS algorithm include the following:
1) Operation set $\mathcal{O}$;
2) Parametric operation set $\mathcal{O}^P \subset \mathcal{O}$;
3) Parameterless operation set $\mathcal{O}^l = \mathcal{O} \dagger \mathcal{O}^P$;
4) The input of node j, $z_i$;

The parameter for the MergeNAS algorithm includes the following:
1) The sharing weights for edge $e_{ij}$ of one-shot model ($W_{ij}$ for normal, and $W_{ij}^d$, $W_{ij}^p$ for separable convolution);
2) The architecture parameters for edge $e_{ij}$, $\alpha_{ij}^o$, $o \in \mathcal{O}$;
3) Mask matrix for convolutional operations $M^o$, $o \in \mathcal{O}^P$;

The output of this MergeNAS algorithm is the output of node j, $z_j$.

Finally, the operational steps of the MergeNAS algorithm includes the following operations (not necessarily in the following order):

1:    Compute the saliency matrix $\tilde{M}_{ij} = \sum_{o \in \mathcal{O}^P} \alpha_{ij}^o M^o$;
2:    if normal convolution in $\mathcal{O}^P$ then
3:       $\tilde{W}_{ij} = \tilde{M}_{ij} \cdot W_{ij}$
4:       Compute the single convolution with weights $\tilde{W}_{ij}$;
       $o^p(z_i) = z_i * \tilde{W}_{ij}$
5:    else if separable convolution in $\mathcal{O}^P$ then
6:       $\tilde{W}_{ij}^d = \tilde{M}_{ij} \cdot W_{ij}^d$;

```
 7:   Compute single separable convolution with depth-wise
      weights $W_{ij}^d$ and point-wise weights $W_{ij}^p$;
      $o_j^p(z_i) = z_i * W_{ij}^d * W_{ij}^p$
 8:   end if
 9:   
      $o_j(z_i) = o_j^p(z_i) + \sum_{o \in O^p} \alpha_{ij}^o o_{ij}(z_i)$
10:   return the output of edge $e_{ij}$, $o_j(z_i)$;
```

Some embodiments of the present invention recognize the following facts, potential problems and/or potential areas for improvement with respect to the current state of the art: (i) differentiable architecture search (DARTS) is a promising one-shot architecture approach for its clear mathematical format and good results; and (ii) besides having a high memory utilization and a large computation requirement often suffered in one-shot models, many research publications have shown that DARTS causes a severe over-fitting problem and thus does not work robustly for many new tasks.

Some embodiments of the present invention may include one, or more, of the following features, characteristics and/or advantages: (i) choosing a proper neural network architecture and identifying a good set of parameters is critical; (ii) choosing the proper neural network architecture and identifying the set of parameters needs experts' experience and human labor; (iii) innovations such as auto machine learning (AutoML) have been developed to overcome these potentially tedious requirements; (iv) AutoML automatically searches for the best model without user intervention; (v) redundant parameters in one-shot model limits the searching space; (vi) weight sharing strategy in ENAS reuse the weights of the same operations in different models; (vii) reuses the weights among the kernels and operates the convolutional layer in one step; (viii) uses a multi-path one-shot model.

Some embodiments of the present invention may include one, or more, of the following features, characteristics and/or advantages: (i) creates a one-shot neural architecture search method referred to as MergeNAS by merging different types of convolutions into one operation; (ii) this mergence approach reduces the search cost to about half a GPU per day; (iii) this mergence approach alleviates the over-fitting problem by reducing the redundant parameters; (iv) extensive experiments on different search space and various datasets have been conducted to verify this approach; and (v) these extensive experiments show that the MergeNAS search method can converge to a stable architecture and achieve better performance with fewer parameters and search cost.

Some embodiments of the present invention may include one, or more, of the following features, characteristics and/or advantages: (i) four convolutions (3*3 convolution/dilated convolution, 5*5 convolution/dilated convolution) can share the same weights tensor with kernel size 9*9; (ii) binary matrix masks can be used to activate items from weights tensor for each convolution; (iii) four convolutions can be merged into one convolution, whose kernel is weighted average of the different convolution kernels; and (iv) four separable convolutions can be merged into one by reusing both the weights of depth-wise and point-wise convolution.

Some embodiments of the present invention include the following propositions: (i) a convolution equals to a set of convolution with larger kernel size; and (ii) a dilated convolution with kernel size k and dilated rate r equals to a normal convolution with kernel size $r*(k-1)+1$.

Some embodiments of the present invention provide a method of weighting the merge, which includes the following process: (i) enlarge the kernel size of all convolutions to a fixed value K; (ii) convolutions in one edge reuse the same weight tensor $W \in \mathbb{R}^{\wedge}(C\_o \times C\_i \times K \times K)$; and (iii) Weights of convolution o, $W^{\wedge}o = W \cdot M^{\wedge}o$.

Some embodiments of the present invention include the following propositions: (i) $o\_j(z\_i) = \Sigma\_(o \in O) [\![ \alpha\_{ij} \hat{} o \cdot o\_{ij}(z\_i) ]\!]$ is a linear operation; (ii) Convolutions are linear operations; (iii) with respect to MergeNAS, convolutions with the same kernel size can be merged into one convolution, whose kernel $\tilde{W}$ is weighted average of the different convolution kernels; (iv) no activation and normalization layers between the depth-wise and point-wise convolution in the search space of DARTS/ENAS; and (v) both the weights of depth-wise and point-wise convolution $W^{\wedge}d$, $W^{\wedge}p$ can be reused.

In order to understand embodiments of the present invention, it is important to note that, for One-shot NAS, the neural architecture can be represented as a Directed Acyclic Graph (DAG). Additionally, a "one-shot" model can be constructed which integrates all types of operations and connections. This construction can occur through the use of the following mathematical formulas:

$$o_j(z_i) = \sum_{o \in O} \alpha_{ij}^o \cdot o_{ij}(z_i) \quad \text{(Formula 1)}$$

$$z_j = \sum_{i<j} o_j(z_i) \quad \text{(Formula 2)}$$

With respect to Formula 1 and Formula 2, the definitions for the variables used include: (i) $z_i$: output of node i; (ii) $O$: a set of candidate operations (search space); (iii) $o_{ij}$: the operation o between node i and j; and (iv) $\alpha_{ij}^o$: the saliency of operations o in edges $e_{ij}$.

Additionally, the following mathematical restraints are used with Formula 1 and Formula 2 (shown below):

$$\min_{\alpha} \mathcal{L}_{val}(\omega^*(\alpha), \alpha) \quad (1)$$

$$\text{s.t.} \quad \omega^*(\alpha) = \arg\min_{\omega} \mathcal{L}_{train}(\omega, \alpha) \quad (2)$$

Some embodiments of the present invention merges a normal convolution through the use of the following mathematical formulas (Formulas 3 and 4, shown below).

$$o^P(z) = \sum_{o \in O^P} \alpha^o \cdot [z * W^o] = z * \left[\sum_{o \in O^P} \alpha^o \cdot W^o\right] = z * \tilde{W} \quad \text{(Formula 3)}$$

$$\tilde{W} = \sum_{o \in O^P} \alpha^o \cdot W^o = \left[\sum_{o \in O^P} \alpha^o \cdot M^o\right] \cdot W = \tilde{M} \cdot W \quad \text{(Formula 4)}$$

With respect to Formula 3 and Formula 4, the definitions for the variables used include: (i) z: input tensor; (ii) $O^P$: a set of candidate convolutions; (iii) $\alpha^o$: the saliency of operations o; (iv) $W^o$: kernel of operation o; and (v) $M^o$: mask for operation o.

Some embodiments of the present invention merges a separable convolution through the use of the following mathematical expression (Formula 5, shown below).

With respect to merging the separable convolutions, the following two facts are critical: (i) no activation and normalization layers between the depth-wise and point-wise convolution in the search space of DARTS/ENAS; and (ii) both the weights of depth-wise and point-wise convolution $W^d$, $W^p$ can be reused.

$$W^{s,o} = W^{d,o} * W^{p,o} = [W^{d,o}]^T \cdot W^{p,o} = [M^{s,o} \cdot W^d]^T \cdot W^p \quad \text{(Formula 5)}$$

$$\tilde{W} = \sum_{o \in O^p} \alpha^o \cdot W^{s,o} = \sum_{o \in O^p} \alpha^o \cdot [M^{s,o} \cdot W^d]^T \cdot W^{p,o} =$$

$$[W^d]^T \cdot W^p \cdot \left[ \sum_{o \in O^p} \alpha^o \cdot M^{s,o} \right] = \tilde{M} \cdot W^d * W^p$$

$$o^p(z) = z * \tilde{W}$$

With respect to Formula 5, the definitions for the variables used include: (i) $W^{s,o}$: kernel of a separable convolution o; (ii) $W^{d,o}$: kernel of a depth-wise convolution; (iii) $W^{p,o}$: kernel of a point-wise convolution; (iv) $M^{s,o}$: mask for separable convolution o; (v) $W^d$: reused depth-wise convolution; and (vi) $W^p$: reused point-wise convolution.

Table 400 of FIG. 4 shows experimental results for various types of search architectures. Table 400 lists the architecture search type, test error percentages (with a +/−variance), parameter values, number of operations, search cost (measured in GPU-day), and the search method. More specifically, table 400 provides a comparison with state of the art image classifiers on CIFAR10, where a lower error rate is indicative of better search performance. Additionally, table 400 shows that, similar to DARTS, the search cost for MergeNAS does not include the selection cost or the final evaluation cost. Rather, the search cost only includes the time of the searching process on the NVIDIA 1080 Ti graphics card.

Table 500 of FIG. 5 also shows experimental results for various types of search architectures. Table 500 lists the architecture search type, test accuracy percentage on CIFAR10 for three trials (trial 1, trial 2 and trial 3), CIFAR 100 and ImageNet-16-120.

More specifically, table 500 provides a comparison with state of the art image classifiers on NAS-Bench-201. In table 500, the optimal values are provided by the NAS-Bench-201, which indicates the best architecture in the search space. Embodiments of the present invention evaluate DARTS and MergeNAS for three times under different random seed and provide the test accuracy of each trial on CIFAR10, CIFAR100 and ImageNet-16-120. Embodiments of the present invention show that MergeNAS is able to converge to the same architecture under different random seeds. This means that the accuracy of the three trials (trial 1, trial 2 and trial 3) are the same. Additionally, embodiments of the present invention directly index for the detailed information of each architecture type).

Some embodiments of the present invention may include one, or more, of the following features, characteristics and/or advantages: (i) the main contribution of embodiments of the present invention is sharing weights/merge computation among different types of convolutions (such as normal convolution and separable convolution); (ii) convolutions are essential in Image; (iii) in Tabular data, MLP or its enhanced variants is used; (iii) it is not necessarily intuitive to apply MergeNAS or DARTS for Deep Learning on Tabular data; and (iv) weight-sharing techniques are used with respect to NeuNets.

Figure 6:
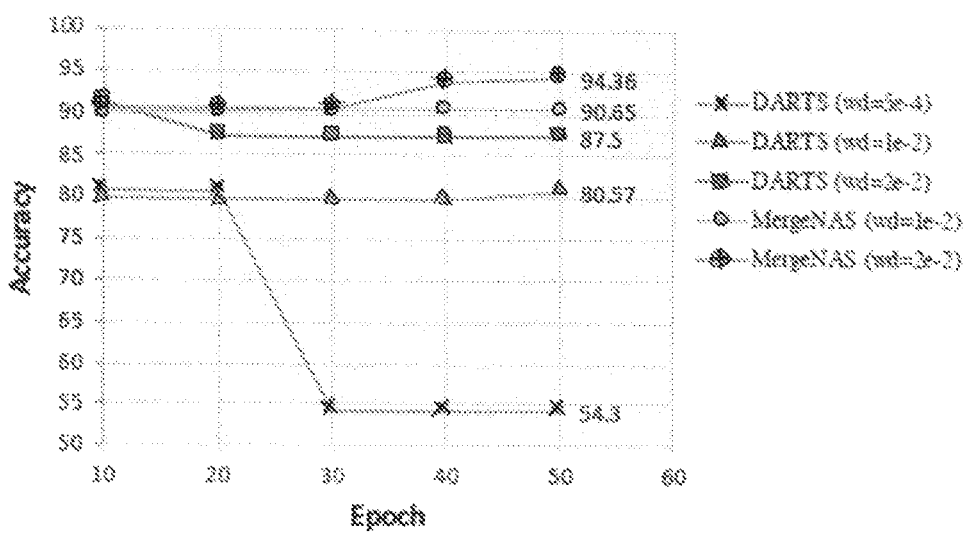
FIG. 6 is a graph showing information that is helpful in understanding embodiments of the present invention.

Graph 600 of FIG. 6 shows the stability by weight decay for both DARTS and MergeNAS, with a percentage accuracy representing the y-axis of the graph, and an epoch value representing the x-axis. Graph 600 shows the following results: (i) DARTS (wd=5e−4) with a 54.3% accuracy; (ii) DARTS (wd=1e−2) with a 80.57% accuracy; (iii) DARTS (wd=2e−2) with a 87.5% accuracy; (iv) MergeNAS (wd=1e−2) with a 90.65% accuracy; and (v) MergeNAS (wd=2e−2) with a 94.36% accuracy.

Definitions are provided below for critical and (sometimes recurring) terms that are essential to understanding the context in which certain embodiments of the present invention are discussed.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a plurality of convolutions, with each given convolution of the plurality of convolutions being characterized by a same kernel size of n*n and including a kernel and a corresponding weight tensor that includes a plurality of depth-wise weights and a plurality of point-wise weights, and wherein the plurality of convolutions comprises normal convolution and separable convolution;
merging the plurality of convolutions into a single merged convolution the being characterized by a kernel size of m*m, where m is greater than n, with a kernel of the single merged convolution being calculated based on a weighted average of kernels for the plurality of convolutions, by utilizing weighting factors from the weight tensors of the plurality of convolutions so that depth-wise and point-wise weights are reused in the merging operation; and
creating a one-shot neural architecture search method based on the single merged convolution to reduce search cost.

2. A computer program product (CPP) comprising:
a non-transitory machine readable storage device; and
computer code stored on the non-transitory machine readable storage device, with the computer code including instructions and data for causing a processor(s) set to perform operations including the following:
receiving a plurality of convolutions, with each given convolution of the plurality of convolutions being characterized by a kernel size of n*n and including a kernel and a corresponding weight tensor that includes a plurality of depth-wise weights and a plurality of point-wise weights;
merging the plurality of convolutions into a single merged convolution the being characterized by a kernel size of m*m, where m is greater than n, with a kernel of the single merged convolution being calculated based on a weighted average of the kernels utilizing weighting factors from the weight tensors of the plurality of convolutions so that depth-wise and point-wise weights are reused in the merging operation; and
creating a one-shot neural architecture search method based on the single merged convolution to reduce search cost.

3. A computer system (CS) comprising:
a processor(s) set;
a non-transitory machine readable storage device; and
computer code stored on the non-transitory machine readable storage device, with the computer code including instructions and data for causing the processor(s) set to perform operations including the following:
receiving a plurality of convolutions, with each given convolution of the plurality of convolutions being characterized by a kernel size of n*n and including a kernel and a corresponding weight tensor that includes a plurality of depth-wise weights and a plurality of point-wise weights;
merging the plurality of convolutions into a single merged convolution the being characterized by a kernel size of m*m, where m is greater than n, with a kernel of the single merged convolution being calculated based on a weighted average of the kernels utilizing weighting factors from the weight tensors of the plurality of convolutions so that depth-wise and point-wise weights are reused in the merging operation; and
creating a one-shot neural architecture search method based on the single merged convolution to reduce search cost.

* * * * *